United States Patent [19]
Watanabe et al.

[11] Patent Number: 5,657,217
[45] Date of Patent: Aug. 12, 1997

[54] MULTI-COUPLED POWER CONVERSION SYSTEM AND CONTROL METHOD FOR THE SAME

[75] Inventors: Eiji Watanabe; Hiroaki Matsunaga, both of Kitakyushu, Japan

[73] Assignee: Kabushiki Kaisha Yaskawa Denki, Fukuoka, Japan

[21] Appl. No.: 537,755

[22] PCT Filed: Mar. 1, 1995

[86] PCT No.: PCT/JP95/00327

§ 371 Date: Oct. 23, 1995

§ 102(e) Date: Oct. 23, 1995

[87] PCT Pub. No.: WO95/24069

PCT Pub. Date: Sep. 8, 1995

[30] Foreign Application Priority Data

Mar. 2, 1994 [JP] Japan ............... 6-058109

[51] Int. Cl.⁶ ............................... H02M 7/519
[52] U.S. Cl. .................................................. 363/71
[58] Field of Search ....................... 363/65, 71, 40, 363/41, 55, 56, 95, 131

[56] References Cited

U.S. PATENT DOCUMENTS

| | | | |
|---|---|---|---|
| 4,802,079 | 1/1989 | Mizoguchi | 363/71 |
| 4,843,534 | 6/1989 | Taddeo et al. | 363/71 |
| 5,016,158 | 5/1991 | Matsui et al. | 363/71 |
| 5,436,823 | 7/1995 | Araki | 363/71 |
| 5,450,309 | 9/1995 | Rohner | 363/71 |

FOREIGN PATENT DOCUMENTS

| | | |
|---|---|---|
| 60-98875 | 6/1985 | Japan. |
| 63-124769 | 5/1988 | Japan. |
| 63-287371 | 11/1988 | Japan. |
| 5-56648 | 3/1993 | Japan. |
| 5-211775 | 8/1993 | Japan. |
| 6-178546 | 6/1994 | Japan. |

*Primary Examiner*—Matthew V. Nguyen
*Attorney, Agent, or Firm*—Jordan and Hamburg

[57] ABSTRACT

This invention is a multi-coupled power conversion system including power converters 114 and 124 connected in parallel through reactors 105, with each power converter converting a d.c. voltage into an a.c. voltage by means of automatic turn-off switching devices which turn on and off in response to on/off commands. The system includes a spatial voltage vector calculator 101 which, in order to provide the on/off commands for the parallel-connected power converters 114 and 124, selects multiple spatial voltage vectors in accordance with the amplitude Vc and phase θ of the command of the a.c. voltage to be produced by the power converters 114 and 124 and calculates vector output times, a vector permutation device 102 which determines two sets of the order of generation of the selected spatial voltage vectors, and PWM generators 113 and 123 which generate the on/off commands in response to the output of said vector permutation device 102. The system further includes a means of controlling the output voltages of the power converters 114 and 124 by providing the PWM generators 113 and 123 with two sets of spatial voltage vector series of different orders determined by the vector permutation device 102.

8 Claims, 7 Drawing Sheets

| | (U, V, W) |
|---|---|
| V0 | (0, 0, 0) |
| V1 | (1, 0, 0) |
| V2 | (1, 1, 0) |
| V3 | (0, 1, 0) |
| V4 | (0, 1, 1) |
| V5 | (0, 0, 1) |
| V6 | (0, 0, 1) |
| V7 | (1, 0, 1) |

(a)

(b)

| phase [deg] | Vi | Vj | N |
|---|---|---|---|
| 0 ≦ θ < 60 | V1 | V2 | 0 |
| 60 ≦ θ < 120 | V3 | V2 | 1 |
| 120 ≦ θ < 180 | V3 | V4 | 2 |
| 180 ≦ θ < 240 | V5 | V4 | 3 |
| 240 ≦ θ < 300 | V5 | V6 | 4 |
| 300 ≦ θ < 360 | V1 | V6 | 5 |

(c)

| P1 | Vi→Vj→V7→Vj→Vi→V0 |
|---|---|
| P2 | V0→Vi→Vj→V7→Vj→Vi |

(d)

(a)

(b)

MULTI-COUPLED POWER CONVERSION SYSTEM AND CONTROL METHOD FOR THE SAME

BACKGROUND OF THE INVENTION

The present invention relates to a system of multi-coupled PWM-controlled power converters (inverters) which reduces the harmonic components of output voltage and suppresses circulating currents flowing between the PWM-controlled power converters, and also relates to a control method for the same.

There is a conventional power conversion system which reduces the harmonic components of output voltage, as disclosed in Unexamined Japanese Patent Publication No. Sho 60-98875 (to be referred to as "Citation 1" hereinafter). The Citation 1 is a method of controlling a multi-coupled power conversion system including voltage-type PWM-controlled power converters of n in number (n is an integer of two or greater) connected in parallel, with interphase reactors being provided between common-phase output terminals of the power converters, and it is characterized by the shifting in steps of 360/n degrees of the carrier signals which control individual power converters. Namely, the carrier signals that are the base signals for producing the PWM waveform of the parallel-connected power converters are given phase differences of 360/n degrees in correspondence to the power converters, thereby reducing the harmonic components of the output voltage.

However, although the prior art of Citation 1 is capable of reducing the harmonic components of the output voltage, it has the problem of a smaller effect of harmonic reduction for line voltages that are the composition of the phase voltages. Because of this, the harmonic components of output current created in proportion to the line voltage cannot be reduced sufficiently, and in the case of driving a motor, for example, a torque ripple and speed ripple are created and the motor cannot rotate stably.

Although the prior art disclosed in Citation 1 is capable of reducing the harmonic components of the output voltage, there arise lateral currents flowing between the output phases of the power converters, so that the motor supply current decreases and large output interphase reactors are needed.

There is another conventional power conversion system described in Unexamined Japanese Patent Publication No. Hei 5-211775 (to be referred to as "Citation 2" hereinafter). This is a serial or parallel multi-coupled power conversion system having its output voltage controlled by pulse-width modulation, in which a zero-voltage vector adjacent to the command output voltage vector and having a zero line voltage, a neutral-voltage vector of a varying neutral voltage or a neutral-voltage vector of a varying neutral-voltage is selected based on the amplitude and phase of the command output voltage vector, with the order of selection of the three voltage vectors in the specified period being controlled so that the zero-voltage vector or neutral-voltage vector comes first.

The prior art of Citation 2 is a means of preventing the loss of harmonic reduction of the output voltage, which is the feature of the serial multi-coupled power conversion system. This is in contrast to the usual 2-level power conversion system which produces two positive or negative voltages, in which case, when the command output voltage has its amplitude increased, the zero output voltage period decreases and the positive (output voltage: E) or negative (output voltage: −E) period increases, resulting in an increased amplitude of output voltage. The citation 2 does not deal with the state of a smaller amplitude of output voltage, i.e., this is not a power conversion system which reduces the harmonic components irrespective of the amplitude of output voltage.

Unexamined Japanese Patent Publication No. Hei 5-56648 (to be referred to as "Citation 3" hereinafter) discloses a parallel operation controller for a PWM power conversion system. The controller includes output current detectors for individual power converters, a circulating current calculator which calculates the circulating currents of the power converters based on the detected output currents, and a parallel operation inhibition circuit which produces and feeds a base cutoff signal to one power converter when a circulating current exceeds a certain value.

However, the prior art disclosed in Citation 3 has a problem in that when the base cutoff operation takes place, the output current decreases to the point where it is unable to drive a load such as a motor.

SUMMARY OF THE INVENTION

The first object of this invention is to provide a multi-coupled power conversion system which reduces the harmonic waves of line voltages of the output voltage and also reduces the harmonic waves of the phase voltages.

The second object of this invention is to make the interphase reactors more compact and to increase the motor supply current based on the detection of output currents of individual power converters and by controlling the on/off commands of PWM so that the difference of the phase currents, i.e., lateral current, diminishes.

In order to achieve the first objective, the present invention resides in a multi-coupled power conversion system including power converters connected in parallel through reactors, with each power converter converting voltage from a d.c. power source provided for the system into a.c. voltage by means of automatic turnoff switching devices which turn on and off in response to on/off commands, wherein the system includes a spatial voltage vector calculator which, in order to provide the on/off commands for the parallel-connected power converters, selects multiple spatial voltage vectors in accordance with the amplitude and phase of the a.c. voltage to be produced by the power conversion system and calculates vector output times, a vector permutation device which determines two sets of the order of generation of the selected spatial voltage vectors, and PWM generators which generate the on/off commands in response to the output of the vector permutation device, with the two sets of spatial voltage vector series of different orders determined by the vector permutation device being fed to the PWM generators thereby to control the output voltages of the power converters.

The inventive control method for a multi-coupled power conversion system is a control method for a multi-coupled power conversion system including first and second power converters connected in parallel through reactors, with each converter converting a voltage from a d.c. power source provided for the system into a.c. voltage by means of automatic turn-off switching devices which turn on and off in response to on/off commands, wherein for multiple spatial voltage vectors which generate on/off commands to be fed to individual power converters, the order of a second series of spatial voltage vectors having different output times and fed to the second power converters is shifted with respect to a first series of spatial voltage vectors having different output times and fed to the first power converter by the amount of the output time of the spatial voltage vector located at the end of the first series.

According to this invention, the amount of variation of the output line voltage waveform produced by composition by the reactors can be reduced and the harmonic components of the output line voltage waveform can be reduced significantly. Consequently, the harmonic components of the output current determined from the harmonic components of the output line voltage are reduced and, in the case of driving an a.c. motor for example, the torque ripple and speed ripple of the a.c. motor can be reduced. The inventive system enables servo calculation control based on the extremely smooth rotation of the a.c. motor, and contributes significantly to the enhanced stability of the control system.

In order to achieve the second objective, the present invention resides in a multi-coupled power conversion system including power converters connected in parallel through reactors, with each converter converting a voltage from a d.c. power source provided for the system into an a.c. voltage by means of automatic turn-off switching devices which turn on and off in response to on/off commands, wherein the system includes a spatial voltage vector calculator which, in order to provide the on/off commands to the parallel-connected power converters, selects multiple voltage vectors in accordance with the amplitude and phase of the a.c. voltage to be produced by the power conversion system and calculates vector output times, a vector permutation device which, for the selected spatial voltage vectors, determines two sets of the order of generation of spatial voltage vectors by shifting the order of a second series of spatial voltage vectors to be fed to the second power converter with respect to a first series of spatial voltage vectors to be fed to the first power converter by the amount of the output time of the spatial voltage vector located at the end of the first series, and a pulse width modulator which generates the on/off commands in response to the output of the vector permutation device, with the two sets of spatial voltage vector series having different orders established by the vector permutation device being fed to the pulse width modulator thereby to control the output voltages of the power converters, and wherein the system further includes current detectors provided for individual output phases of the two power converters, with the difference of output currents of the first and second power converters being calculated for each output phase as a lateral current component.

According to this invention, the lateral currents flowing between output phases of the power converters can be suppressed, and consequently the output reactors can be made compact and the motor supply current can be increased.

DETAILED DESCRIPTION OF INVENTION

The embodiments of this invention will be explained with reference to the drawings.

Figure 1:
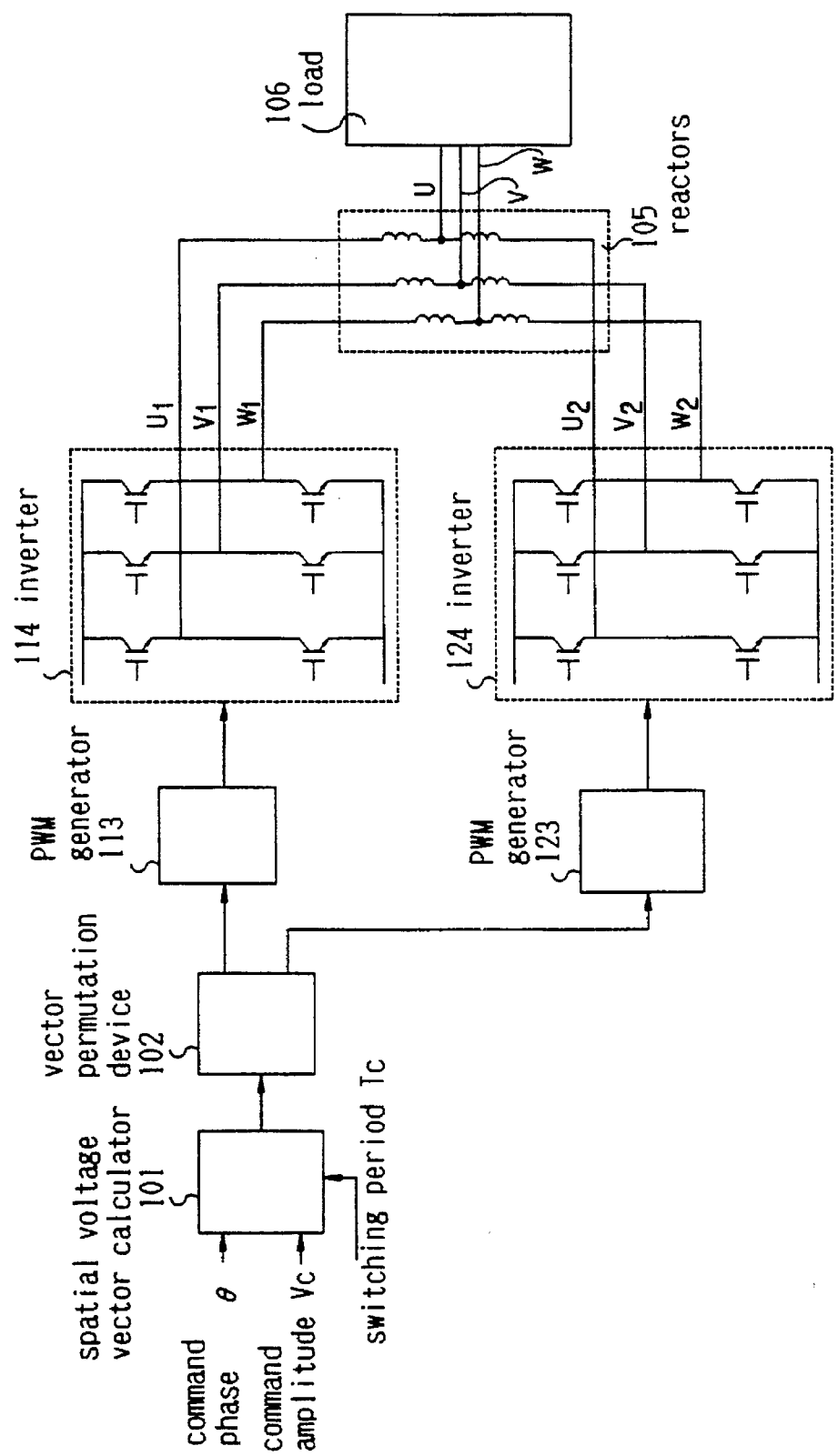
FIG. 1 is a block diagram showing the circuit arrangement of an embodiment of this invention.

FIG. 1 is a block diagram showing the circuit arrangement of an embodiment of this invention. This embodiment is the case of the parallel operation of two voltage-type, 3-phase PWM (pulse width modulation) power converters using IGBTs (Insulated Gate Bipolar Transistors) as automatic turn-off switching devices. In FIG. 1, reference numeral 101 denotes a spatial voltage vector calculator, which operates as follows.

Figure 2:
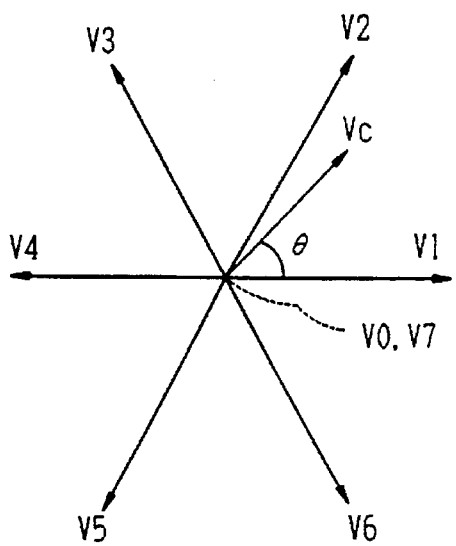
FIG. 2 is a set of diagrams including a conceptual diagram of the spatial voltage vectors applied to the embodiment of this invention and tables of the selected spatial voltage vectors and the spatial voltage vector series which determine the order of the selected spatial voltage vectors.

Initially, a switching period, command amplitude Vc and command phase (electrical angle) θ are fed to the spatial voltage vector calculator 101. Spatial voltage Vectors are to indicate the switching states of the power converters, and there are eight spatial voltage vectors $[V_0]$, $[V_1]$, $[V_2]$, $[V_3]$, $[V_4]$, $[V_5]$, $[V_6]$ and $[V_7]$ for a 3-phase power converter, with "1" and "0" indicating the on-state and off-state of the switching devices located on the higher voltage side of the d.c. lines, as shown in FIG. 2(a). Among these spatial voltage vectors, vectors $[V_0]$ and $[V_7]$ are specifically called "spatial zero-voltage vectors" (or "zero vectors"). The eight spatial voltage vectors have phase differences of 60° intervals and have an equal magnitude, with the zero vectors being located at the center, as shown in FIG. 2(b). A command spatial voltage vector [Vc] has a command amplitude Vc and has an electrical angle θ with respect to the spatial voltage vector $[V_1]$.

The spatial voltage vector calculator 101 selects two spatial voltage vectors [Vi] and [Vj] depending on the value of electrical angle θ as shown in FIG. 2(c).

Subsequently, output times Ti and Tj of the spatial voltage vectors [Vi] and [Vj] and output times $T_0$ and $T_7$ of the spatial voltage vectors $[V_0]$ and $[V_7]$ are calculated from the command amplitude Vc based on the following equations.

$$Ti=\{Vc \cdot Tc \cdot \sin(60°-\theta a)\}/\{2 \cdot \sin(60°)\} \tag{1}$$

$$Tj=(Vc \cdot Tc \cdot \sin \theta a)/\{2 \cdot \sin(60°)\} \tag{2}$$

$$T_0=T_7=(Tc-Ti-Tj)/2 \tag{3}$$

where θa is the electrical angle of the command spatial voltage vector [Vc] with respect to the selected spatial voltage vector [Vi], and it is expressed as follows:

$$\theta a = \theta - 60° \cdot N \tag{4}$$

and N is a numerical value which depends on the electrical angle θ as listed in FIG. 2(c).

The output times Ti, Tj, $T_0$ and $T_7$ provided by the spatial voltage vector calculator 101 are fed to a vector permutation device 102, by which the order of vector output is determined in accordance with two spatial voltage vector a series P1 and P2 shown in FIG. 2(d). In compliance with this output order, spatial voltage vectors are released for the specified durations. The spatial voltage vector series P1 and P2 are series of spatial voltage vectors established for the first and second power converters 114 and 124, respectively, with the P2 being derived from the P1, having its spatial zero-voltage vector $[V_0]$ at the end moved to the top. Namely, this invention resides in a control method for a multi-coupled system of parallel-connected power converters, in which, for multiple spatial voltage vectors which generate the on/off commands to be fed to individual power converters, the order of the second series of spatial voltage vectors having different output times and fed to the second power converters is shifted with respect to the first series of spatial voltage vectors having different output times and fed to the first power converter by the amount of the output time of the spatial voltage vector located at the end of the first series.

A PWM generator 113 generates PWM waveform voltages in accordance with the released spatial voltage vectors which have been arranged based on the spatial voltage vector series P1 in the vector permutation device 102, and delivers the resulting on/off commands for the switching devices to the gate circuit (not shown) of first power converter 114. Similarly, another PWM generator 123 generates PWM waveform voltages in accordance with spatial voltage vector series P2, and delivers the resulting on/off commands for the switching devices to the gate circuit (not shown) of the second power converter 124.

The first and second power converters 114 and 124 operate the automatic turn-off switching devices in accordance with the PWM output signals produced by the PWM generators 113 and 123, thereby producing 3-phase a.c. voltages. Both power converters have their a.c. output terminals $U_1$ and $U_2$, $V_1$ and $V_2$, and $W_1$ and $W_2$ connected in pairs through reactors 105, and the a.c. voltage produced by both power converters 114 and 124 is supplied to a load 106.

The foregoing operation of this embodiment will be explained more specifically for the case of a command amplitude of Vc=0.3 [P.U.] and a command phase of θ=80° (electrical angle).

For the command phase θ=80°, the spatial voltage vector calculator 101 selects the spatial voltage vector $[V_3]$=(0,1,0) for the spatial voltage vector [Vi] and the spatial voltage vector $[V_2]$=(1,1,0) for the spatial voltage vector [Vj], and calculates the output times $T_3$, $T_2$, $T_0$ and $T_7$ based on the equations (1), (2) and (3). Since the numerical value is N=1, as listed in FIG. 2(c), the angle with the selected spatial voltage vector is calculated to be θa=20° based on the equation (4).

Figure 3:
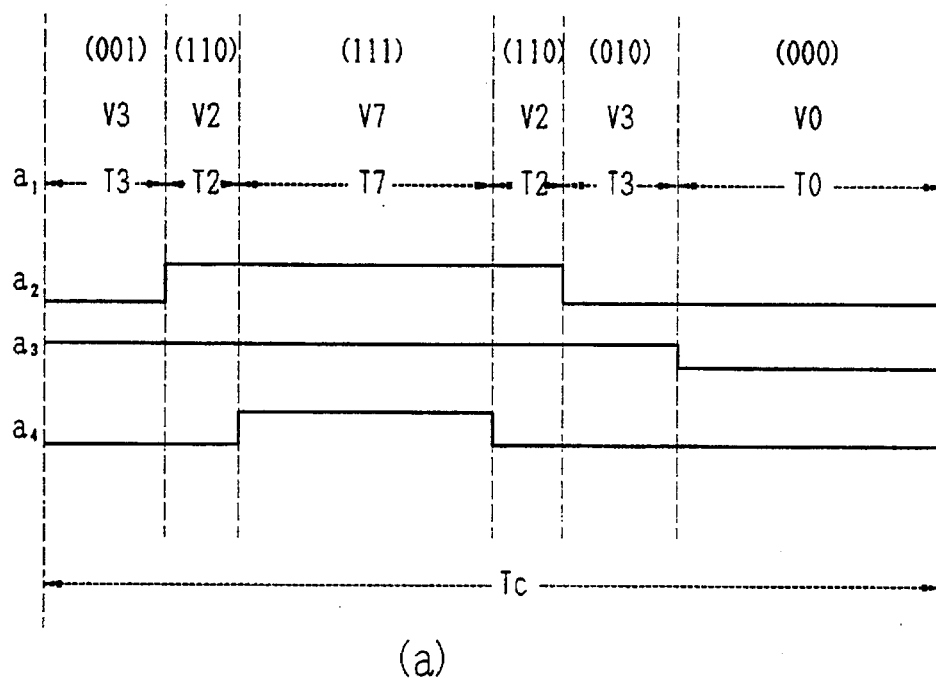
FIG. 3 is a set of diagrams showing an example of PWM waveforms produced by the embodiment of this invention.
Figure 3:
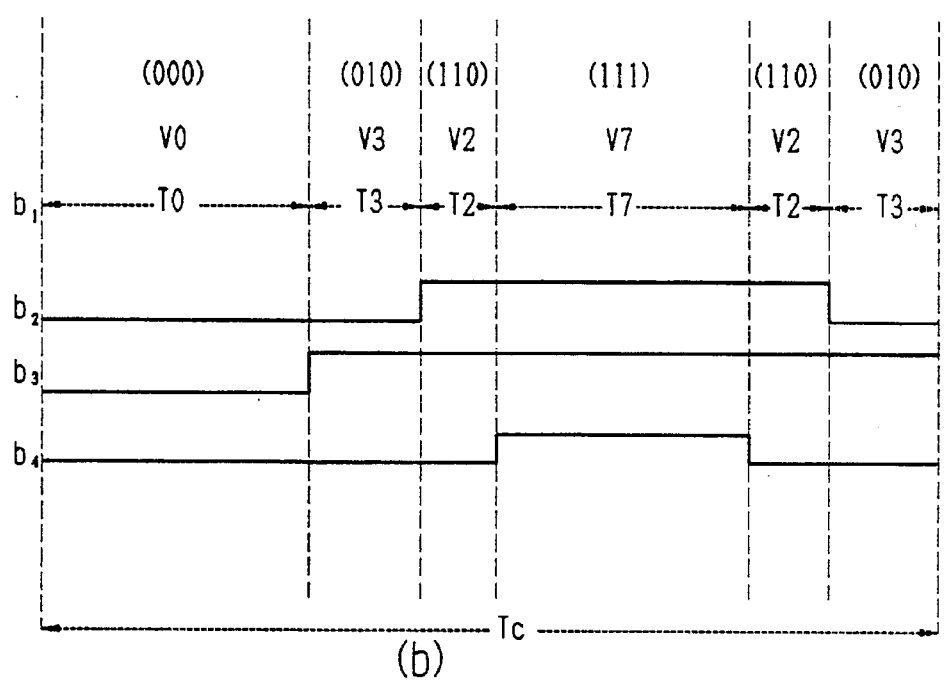

The resulting output times $T_3$, $T_2$, $T_0$ and $T_7$ are fed to the vector permutation device 102, and arranged in accordance with the spatial voltage vector series P1 and P2. The output times arranged based on the spatial voltage vector series P1 (shown by $a_1$ in FIG. 3(a)) are fed to the PWM generator 113, by which 3-phase PWM waveforms are generated as shown by $a_2$, $a_3$ and $a_4$ in FIG. 3(a). Similarly, the output times arranged based on the spatial voltage vector series P2 (shown by $b_1$ in FIG. 3(b)) are fed to the PWM generator 123, by which 3-phase PWM waveforms are generated as shown by $b_2$, $b_3$ and $b_4$ in FIG. 3(b).

Figure 4:
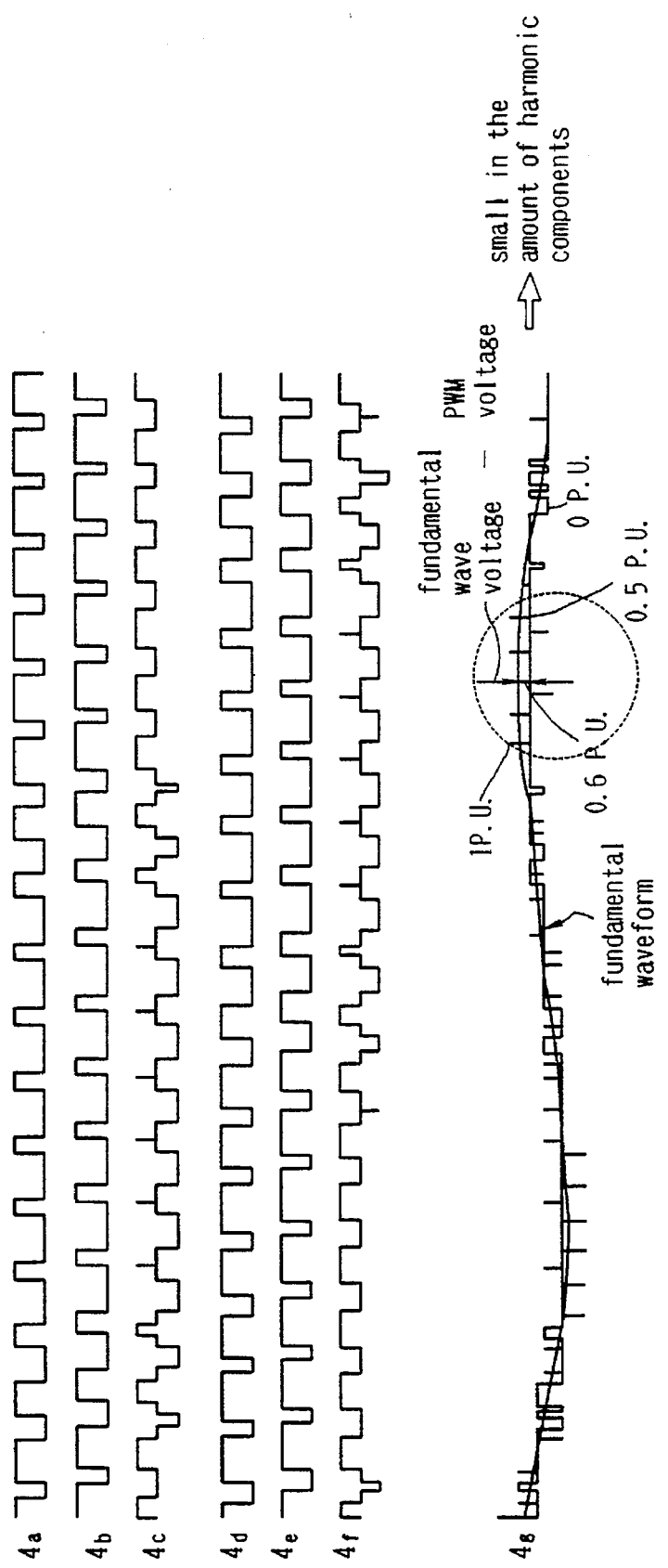
FIG. 4 is a diagram showing PWM waveforms produced by another embodiment of this invention.

FIG. 4 shows the voltage waveforms produced by the on/off operation in accordance with the PWM signals of the automatic turn-off switching devices of the first and second power converters 114 and 124, and these voltage waveforms are for the case of the command amplitude Vc=0.6 [P.U.] as another embodiment of this invention. In FIGS. 4, 4a, 4b, 4d and 4e show the waveforms of phase voltages on the output terminals $U_1$, $U_2$, $V_1$ and $V_2$ in FIGS. 1, 4c and 4f show the composite phase voltages at the points U and V in FIG. 1 produced by both power converters 114 and 124 and coupled by the reactors, and 4g shows the waveform of output line voltage between U and V in FIG. 1 produced by both power converters 114 and 124.

Figure 5:
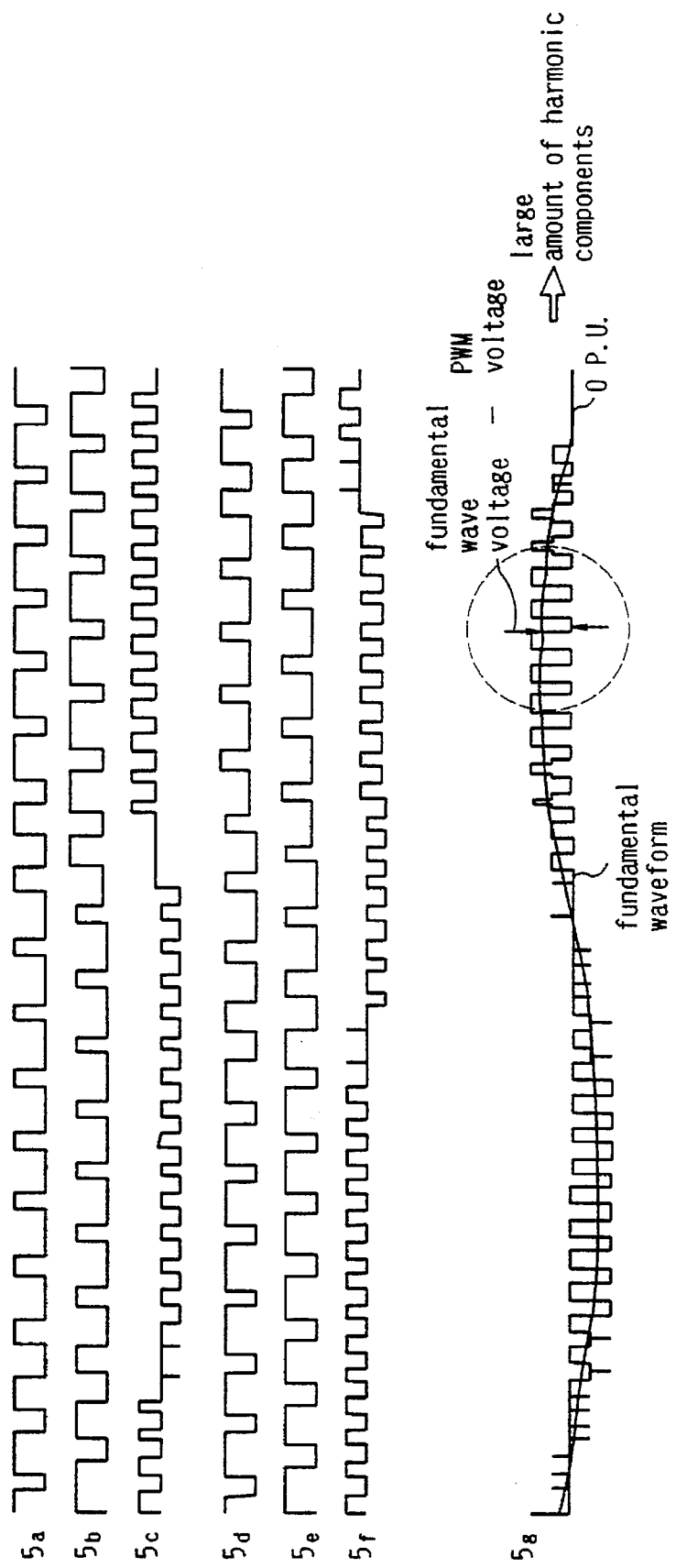
FIG. 5 is a diagram showing PWM waveforms produced by the prior art of Citation 1.

FIG. 5 shows the voltage waveforms produced by the conventional system for the same command amplitude Vc=0.6 [P.U.] as FIG. 4, and the waveforms 5a–5g correspond to the waveforms 4a–4g of FIG. 4. The comparison between the waveforms 4g of FIG. 4 and 5g of FIG. 5 reveals that the line voltage 5g of FIG. 5 is formed of the zero-voltage mode and full-voltage mode and has a large voltage variation. In contrast, the line voltage 4g of FIG. 4 is formed of the zero-voltage mode and intermediate-voltage mode and has a smaller voltage variation. Accordingly, the inventive system significantly reduces the harmonic components of the line voltage.

Specifically, the PWM voltage shown by 4g in FIG. 4 has its level varying in three steps of 1 P.U., 0.5 P.U. and 0 P.U., resulting in a smaller voltage difference from the sinusoidal fundamental voltage waveform, i.e., it includes fewer high-frequency components. In contrast, the PWM voltage shown by 5g in FIG. 5 has its level varying only in one step of 0 P.U., resulting in a greater voltage difference from the sinusoidal fundamental voltage waveform, i.e., it includes more high-frequency components. This superior feature of this invention is based on the sophisticated control scheme of PWM voltage in which the order of the second series of spatial voltage vectors having different output times and fed to the second power converters is shifted with respect to the first series of spatial voltage vectors having different output times and fed to the first power converter by the amount of the output time of the spatial voltage vector located at the end of the first series.

According to this invention, the amount of variation of the output line voltage waveform as a result of composition by the reactors can be reduced and, therefore, the harmonic components of the output line voltage waveform can be reduced significantly. Consequently, the harmonic components of the output current determined from the harmonic components of the output line voltage are reduced and, in the case of driving an a.c. motor for example, the torque ripple and speed ripple of the a.c. motor can be reduced. The inventive system enables servo calculation control based on the extremely smooth rotation of the a.c. motor, and contributes significantly to the enhanced stability of the control system.

Figure 6:
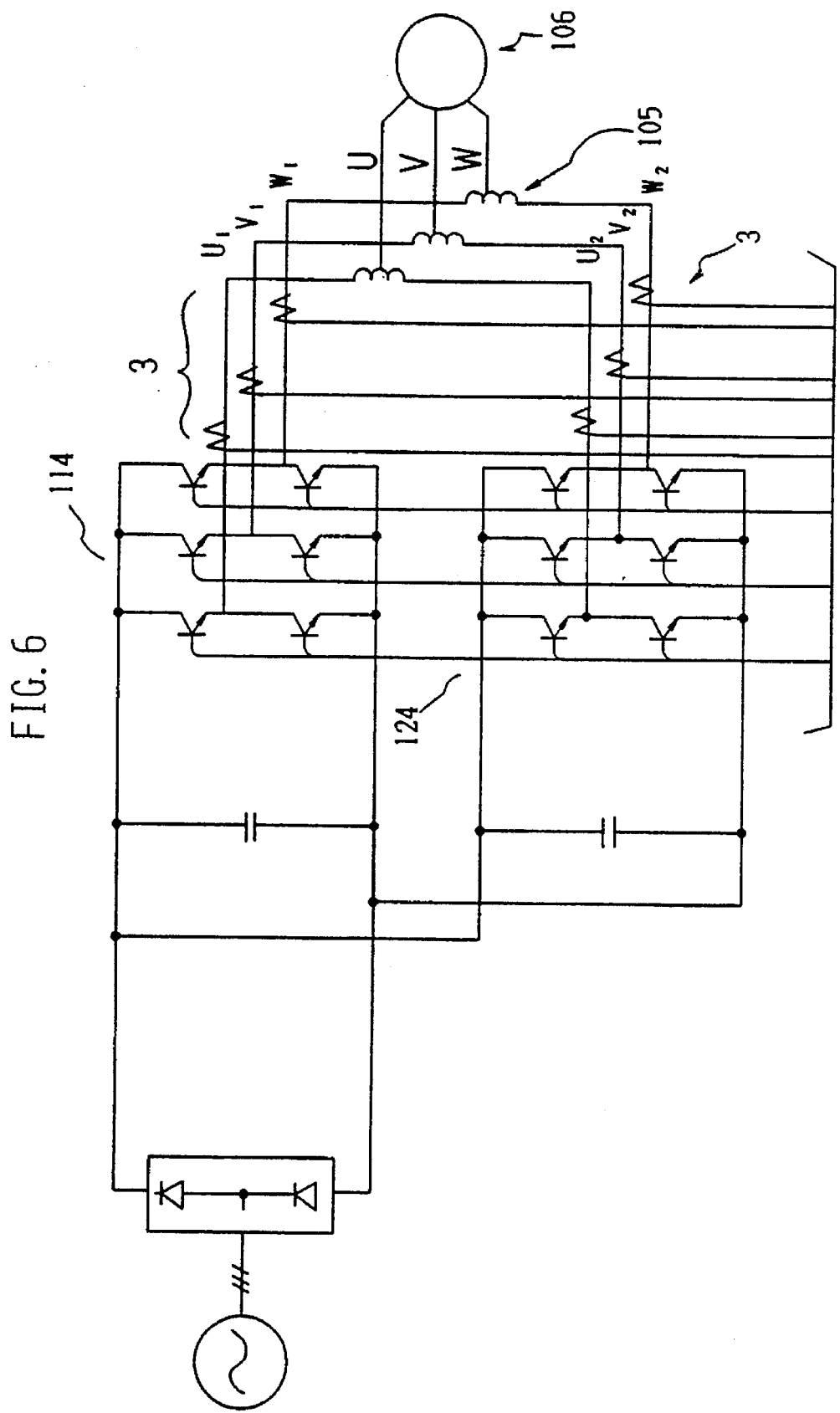
FIG. 6 and FIG. 7 are block diagrams showing the arrangement of yet another embodiment of this invention.
Figure 7:
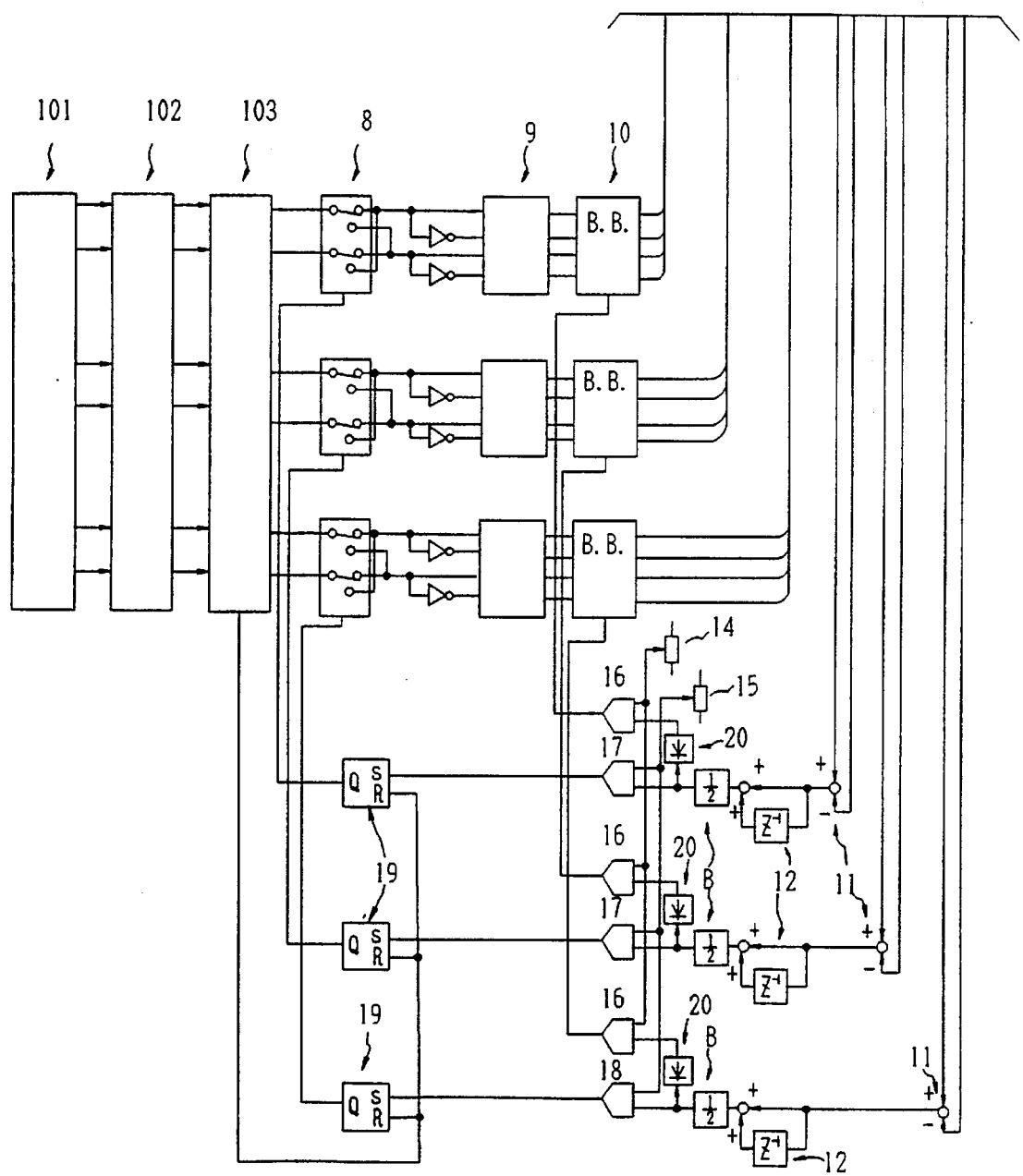

FIG. 6 and FIG. 7 are block diagrams showing yet another embodiment of this invention. This embodiment shows the case of the parallel operation of two voltage-type, 3-phase PWM power converters using IGBTs as automatic turn-off switching devices. In the figure, 101 indicates a spatial vector calculator having a function similar to the counterpart in the embodiment shown in FIG. 1.

The vector calculator 101 produces and feeds output times Ti, Tj, $T_0$ and $T_7$ to the vector permutation device 102, by which the order of vector output is determined in accordance with the two vector series P1 and P2 shown in FIG. 4. In compliance with this output order, these vectors are released for specified durations. The vector series P1 and P2 are established for the first and second power converters 114 and 124, respectively, with the P2 being derived from the P1 having its zero vector $[V_0]$ at the end moved to the top.

A PWM generator 103 generates PWM waveform voltages in accordance with the released spatial voltage vectors which have been arranged based on the spatial voltage vector series P1 in the vector permutation device 102, and delivers the resulting on/off commands for the switching devices to the gate circuit of the first power converter 114. Similarly, the PWM generator 103 generates PWM waveform voltages in accordance with the spatial voltage vector series P2, and delivers the resulting on/off commands for the switching devices to the gate circuit of the second power converter 124.

The PWM generator 103 produces vector state signals, which are "0" when the PWM outputs to be fed to the first and second power converters are both zero vectors ($V_0$ and $V_7$), or "1" in all other cases.

Switches 8 select the "A" position or "B" position in response to "0" or "1" outputs of flip-flops 19 so that the PWM outputs to the first and second power converters are replaced by each other.

On-delay counters 9 retard the "0" to "1" transition of the PWM outputs in order to prevent the short-circuiting of IGBT pairs in the power converter main circuit.

Gate blocking circuits 10 deliver the outputs of the on-delay counters 9 intact to the first and second power converters when comparators 16 produce "0" output signals, or deliver "0" outputs to the power converters irrespective of the outputs of the on-delay counters 9 when the comparator 16 produce "1" output signals.

The first and second power converters 114 and 124 operate the respective automatic turn-off switching devices in response to "1" or "0" PWM outputs, respectively, provided by the respective gate blocking circuits, thereby producing the 3-phase a.c. power.

The power converters have their a.c. output terminal pairs $U_1$ and $U_2$, $V_1$ and $V_2$, and $W_1$ and $W_2$ coupled through the 3-phase reactor 105, and the a.c. power produced by both power converters is supplied to the load 106.

The output currents detected by current detectors 3 are fed to subtracters 11, by which the difference in currents of each phase is evaluated. Each differential current is averaged with the current in a half PWM period detected by a sample-holding circuit 12, and each resulting average differential current is fed to comparators 16 and 17.

The comparator 16 compares the absolute value of the average differential current provided by an absolute value circuit 20 with a preset value provided by a setting device 14, and produces a "1" or "0" output when the absolute value of the average differential current is greater or smaller than the preset value, respectively. The comparator 17 compares the average differential current with a preset value provided by a setting device 15, and produces a "1" or "0" output when the average differential current is greater or smaller than the preset value, respectively. The flip-flops 19 produce the command signals of the switches 8 from the PWM state signals and the outputs of the comparators 17 in compliance with the rule listed in Table 1.

TABLE 1

| PWM state signal (R) | Comparator output (S) | Output |
|---|---|---|
| 0 | 0 | 0 |
| 1 | 0 | 0 |
| 0 | 1 | 1 |
| 1 | 1 | 0 |

Based on the foregoing circuit arrangement, the system operates as follows.

In response to the operation of the comparator 16, the first and second power converters 114 and 124 have their output waveforms replaced by each other, and the lateral current diminishes without having the variation of the phase voltage waveform applied to the load. In response to the operation of the comparator 17, the first and second power converters 114 and 124 have their output waveforms cut off, causing the lateral current to diminish immediately, and the magnetic loss created by the reactor to decrease.

According to this invention, the lateral current flowing between output phases of the power converters is suppressed without variation of the line voltage waveform, and, accordingly, the magnetic loss of the output reactor which increases in proportion to the lateral current can be suppressed. Consequently, it becomes possible to make the output reactor more compact and to increase the motor supply current.

The present invention is useful for large-capacity motor drive systems in steel plants, chemical plants, and the like.

We claim:

1. A multi-coupled power conversion system including power converters connected in parallel through reactors, each of said converters converting a voltage from a d.c. power source provided for said system into an a.c. voltage by means of automatic turn-off switching devices which turn on and off in response to on/off commands, said system comprising:

a spatial voltage vector calculator which, in order to provide the on/off commands for each of said parallel-connected power converters, selects multiple spatial voltage vectors in accordance with the amplitude and phase of a command a.c. voltage to be produced by said power conversion system and calculates vector output times;

a vector permutation device which determines two sets of the order of generation of the selected multiple spatial voltage vectors;

PWM generators which generate the on/off commands in response to the output of said vector permutation device; and means of controlling the output voltages of said power converters by feeding to said PWM generators the two sets of spatial voltage vector series of different orders determined by said vector permutation device.

2. A multi-coupled power conversion system according to claim 1, wherein said spatial voltage vector calculator selects multiple spatial voltage vector calculator selects multiple spatial voltage vectors $V_0$, Vi, Vj and $V_7$ (where i=1,3,5; j=2,4,6) in six divisional sections in the range of 0° to 360° in accordance with the phase of said command a.c. voltage and determines, in accordance with the amplitude Vc of said command a.c. voltage, the output times Ti and Tj of the spatial voltage vector Vi and Vj and the output times $T_0$ and $T_7$ of the spatial zero-voltage vectors $V_0$ and $V_7$ based on the equations:

$$Ti=\{Vc\cdot Tc\cdot\sin(60°-\theta a)\}/\{2\cdot\sin(60°)\}$$

$$Tj=(Vc\cdot Tc\cdot\sin\theta a)/\{2\cdot\sin(60°)\}$$

$$T_0=T_7=(Tc-Ti-Tj)/2$$

$$\theta a=\theta 60°\cdot N$$

where Tc is the switching period, θa is the electrical angle of the command spatial voltage vector Vc determined by the amplitude Vc and phase of said command a.c. voltage, with respect to the selected spatial voltage vector Vi, and N is a numerical value which depends on the phase angle θa and takes 0, 1, 2, . . . , 5 in correspondence to said six sections of 0°≦θ≦60°, 60°≦θ120°, . . . , 300°≦θ≦360°.

3. A multi-coupled power conversion system according to claim 1, wherein said vector permutation device releases two sets of spatial voltage vectors P1 and P2 that are the multiple spatial voltage vectors $V_0$, Vi, Vj and $V_7$ selected by said spatial voltage vector calculator and are arranged in the order of Vi, Vj, $V_7$, Vj, Vi and $V_0$ and in the order of $V_0$, Vi, Vj, $V_7$, Vj and Vi, respectively, and generates the on/off commands to said PWM generators in compliance with these orders.

4. A control method for a power conversion system including first and second power converters connected in parallel through reactors, each of said converters converting a voltage from a d.c. power source provided for said system into an a.c. voltage by means of automatic turn-off switching devices which turn on and off in response to on/off commands, wherein for multiple spatial voltage vectors which generate the on/off commands to be fed to said power converters, the order of a second series of spatial voltage vectors having different output times and fed to said second power converters is shifted with respect to a first series of spatial voltage vectors having different output times and fed to said first power converter by the amount of the output time of the spatial voltage vector located at the end of the first series.

5. A multi-coupled power conversion system including power converters connected in parallel through reactors, each of said converters converting a voltage from a d.c. power source provided for said system into an a.c. voltage by means of automatic turn-off switching devices which turn on and off in response to on/off commands, said system comprising:

a spatial voltage vector calculator which, in order to provide the on/off commands for said parallel-connected power converters, selects multiple spatial voltage vectors in accordance with the amplitude and phase of the a.c. voltage to be produced by said power conversion system and calculates vector output times;

a vector permutation device which, for the selected multiple spatial voltage vectors, determines two sets of the order of generation of spatial voltage vectors by shifting the order of a second series of spatial voltage vectors to be fed to said second power converter with respect to a first series of multiple spatial voltage vectors to be fed to said first power converter by the amount of the output time of the spatial voltage vector located at the end of the first series; and a pulse width modulator which generates the on/off commands in response to the output of said vector permutation device, said two sets of spatial voltage vector series having different orders established by said vector permutation device being fed to said pulse width modulator thereby to control the output Voltages of said power converters, said system further including current detectors provided for individual output phases of said two power converters, and means of calculating, for each output phase, the difference of output currents of said first and second power converters as a lateral current component.

6. A multi-coupled power conversion system according to claim 5 further including means of detecting the output phase currents of said two power converters by sampling the currents in every half PWM period, calculating for each output phase the difference of output currents of said first and second power converters, and evaluating as said lateral current component a mean value of the differential output current which had been sampled and calculated previously and the differential output current which has been newly sampled and calculated.

7. A multi-coupled power conversion system according to claim 5 further including a means of detecting lateral current components of said two parallel-connected power converters, and turning off the on/off signals thereby to shut off said power converters upon detecting said lateral current component in excess of a prescribed value.

8. A multi-coupled power conversion system according to claim 5 further including a means of detecting a lateral current component of each phase of said two parallel-connected power converters, and providing the first series and second series of spatial voltage vectors for said first and second power converters by replacing the first and second series with each other depending on the polarity (positive or negative) of the lateral current component, thereby to control the output voltages of said power converters.

\* \* \* \* \*